(12) United States Patent
Li et al.

(10) Patent No.: US 12,462,563 B2
(45) Date of Patent: Nov. 4, 2025

(54) SYSTEMS AND METHODS FOR VIRTUAL CAMERA HIGHLIGHT CREATION

(71) Applicant: Intel Corporation, Santa Clara, CA (US)

(72) Inventors: Wenlong Li, Beijing (CN); Yumeng Wang, Beijing (CN); Chen Ling, Tianjin (CN); Xiaofeng Tong, Beijing (CN); Qiang Li, Beijing (CN)

(73) Assignee: Intel Corporation, Santa Clara, CA (US)

( * ) Notice: Subject to any disclaimer, the term of this patent is extended or adjusted under 35 U.S.C. 154(b) by 325 days.

(21) Appl. No.: 17/924,580

(22) PCT Filed: Jun. 12, 2020

(86) PCT No.: PCT/CN2020/095849
§ 371 (c)(1),
(2) Date: Nov. 10, 2022

(87) PCT Pub. No.: WO2021/248462
PCT Pub. Date: Dec. 16, 2021

(65) Prior Publication Data
US 2023/0186628 A1    Jun. 15, 2023

(51) Int. Cl.
*G06V 20/40*    (2022.01)
*G06T 7/246*    (2017.01)
(Continued)

(52) U.S. Cl.
CPC ............. *G06V 20/42* (2022.01); *G06T 7/251* (2017.01); *G06T 7/292* (2017.01); *G06V 40/23* (2022.01);
(Continued)

(58) Field of Classification Search
CPC ............. G06T 7/20; G06T 2207/30224; G06T 2207/30221; G06T 7/292; G06T 7/00;
(Continued)

(56) References Cited

U.S. PATENT DOCUMENTS

2002/0136528 A1* 9/2002 Dagtas .............. H04N 21/44008
2003/0179294 A1* 9/2003 Martins .................... G06T 7/292
348/157

(Continued)

FOREIGN PATENT DOCUMENTS

| CN | 101639354 A | 2/2010 |
|---|---|---|
| CN | 104853104 A | 8/2015 |
| CN | 109429052 A | 3/2019 |

OTHER PUBLICATIONS

International Search Report and Written Opinion for PCT/CN2020/095849 mailed Mar. 10, 2021, 9 pages.

*Primary Examiner* — Guillermo M Rivera-Martinez
(74) *Attorney, Agent, or Firm* — Fletcher Yoder, P.C.

(57) ABSTRACT

A system (600) includes multiple cameras (104) disposed about an area (102), a processor (606), and a memory (608) communicatively coupled to the processor. The memory stores instructions that cause the processor to receive a set of video data (602) associated with the cameras. In an embodiment, the set of video data includes a set of image frames associated with a set of ball tracking data (618, 622). In an embodiment, the operations include selecting a first image frame (626) associated with a first change in acceleration and a second image frame (628) associated with a second change in acceleration. In an embodiment, the operations include generating a set of virtual camera actions (630) based on the first image frame and the second image frame.

20 Claims, 7 Drawing Sheets

(51) Int. Cl.
  *G06T 7/292* (2017.01)
  *G06V 40/20* (2022.01)
  *H04N 23/60* (2023.01)
  *H04N 23/61* (2023.01)
  *H04N 23/90* (2023.01)
(52) U.S. Cl.
  CPC ............ *H04N 23/61* (2023.01); *H04N 23/64* (2023.01); *H04N 23/90* (2023.01); *G06T 2207/10016* (2013.01); *G06T 2207/30224* (2013.01); *G06T 2207/30241* (2013.01)
(58) Field of Classification Search
  CPC ...... G06T 19/006; G06V 40/23; G06V 20/42; G06V 20/20; G06V 20/44
  See application file for complete search history.

(56) References Cited

U.S. PATENT DOCUMENTS

| | | | |
|---|---|---|---|
| 2008/0012732 A1* | 1/2008 | Egashira | A63F 13/2145 340/990 |
| 2008/0192116 A1* | 8/2008 | Tamir | G06T 7/292 348/157 |
| 2009/0060352 A1* | 3/2009 | Distante | G06V 10/52 382/224 |
| 2010/0026809 A1* | 2/2010 | Curry | H04N 23/698 348/157 |
| 2013/0178304 A1* | 7/2013 | Chan | G06V 20/42 473/266 |
| 2013/0346009 A1* | 12/2013 | Winter | G01S 13/867 342/55 |
| 2015/0131845 A1* | 5/2015 | Forouhar | G06V 20/44 382/100 |
| 2015/0149837 A1* | 5/2015 | Alonso | G06K 7/10366 714/57 |
| 2015/0254870 A1* | 9/2015 | Knibbe | G06T 19/006 345/633 |
| 2016/0014481 A1* | 1/2016 | Cronin | G11B 27/322 386/281 |
| 2016/0217325 A1* | 7/2016 | Bose | G11B 27/17 |
| 2017/0178687 A1* | 6/2017 | Tamir | G11B 27/036 |
| 2018/0077345 A1* | 3/2018 | Yee | H04N 23/69 |
| 2019/0051045 A1* | 2/2019 | Nishiyama | G06T 1/0007 |
| 2019/0068945 A1* | 2/2019 | Maruyama | A63F 13/5255 |
| 2019/0174109 A1* | 6/2019 | Yoshikawa | H04N 13/243 |
| 2019/0228230 A1* | 7/2019 | Onuma | H04N 21/2187 |
| 2019/0289275 A1* | 9/2019 | Arai | H04N 23/60 |
| 2019/0321683 A1* | 10/2019 | Yerli | H04N 21/21805 |
| 2019/0356906 A1* | 11/2019 | Handa | H04N 13/117 |
| 2020/0168202 A1* | 5/2020 | Park | G06F 18/24143 |
| 2020/0404174 A1* | 12/2020 | Taxbøl | G06T 7/33 |
| 2021/0209372 A1 | 7/2021 | Tong | |
| 2021/0256245 A1 | 8/2021 | Li | |
| 2021/0279896 A1 | 9/2021 | Tong | |

\* cited by examiner

SYSTEMS AND METHODS FOR VIRTUAL CAMERA HIGHLIGHT CREATION

BACKGROUND

This application is a U.S. national stage filing of PCT Application Serial No. PCT/CN2020/095849, filed Jun. 12, 2020, entitled "SYSTEMS AND METHODS FOR VIRTUAL CAMERA HIGHLIGHT CREATION," which is incorporated by reference herein in its entirety for all purposes.

The present disclosure relates generally to virtual camera highlight creation.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

In live broadcasting of events, producers, and/or directors choose camera placements and setups to provide the best "live" viewing experience (e.g., to enable a viewer to feel like they are watching the events in person) and/or views of the event based on the context of the event (e.g., a focused or zoomed in view of particularly exciting moments in the events, such as a player scoring a goal). In addition, camera operators are given instructions on how to operate the camera devices during the events. However, camera operators may be unable to keep track of fast-moving sports and capture all game action occurring on a playing field. Moreover, camera setups may be unable to capture certain angles of game action due to viewing obstructions. As such, producers and/or directors may be limited in selecting views and images for replays of pivotal sequences in game action.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

Figure 1:
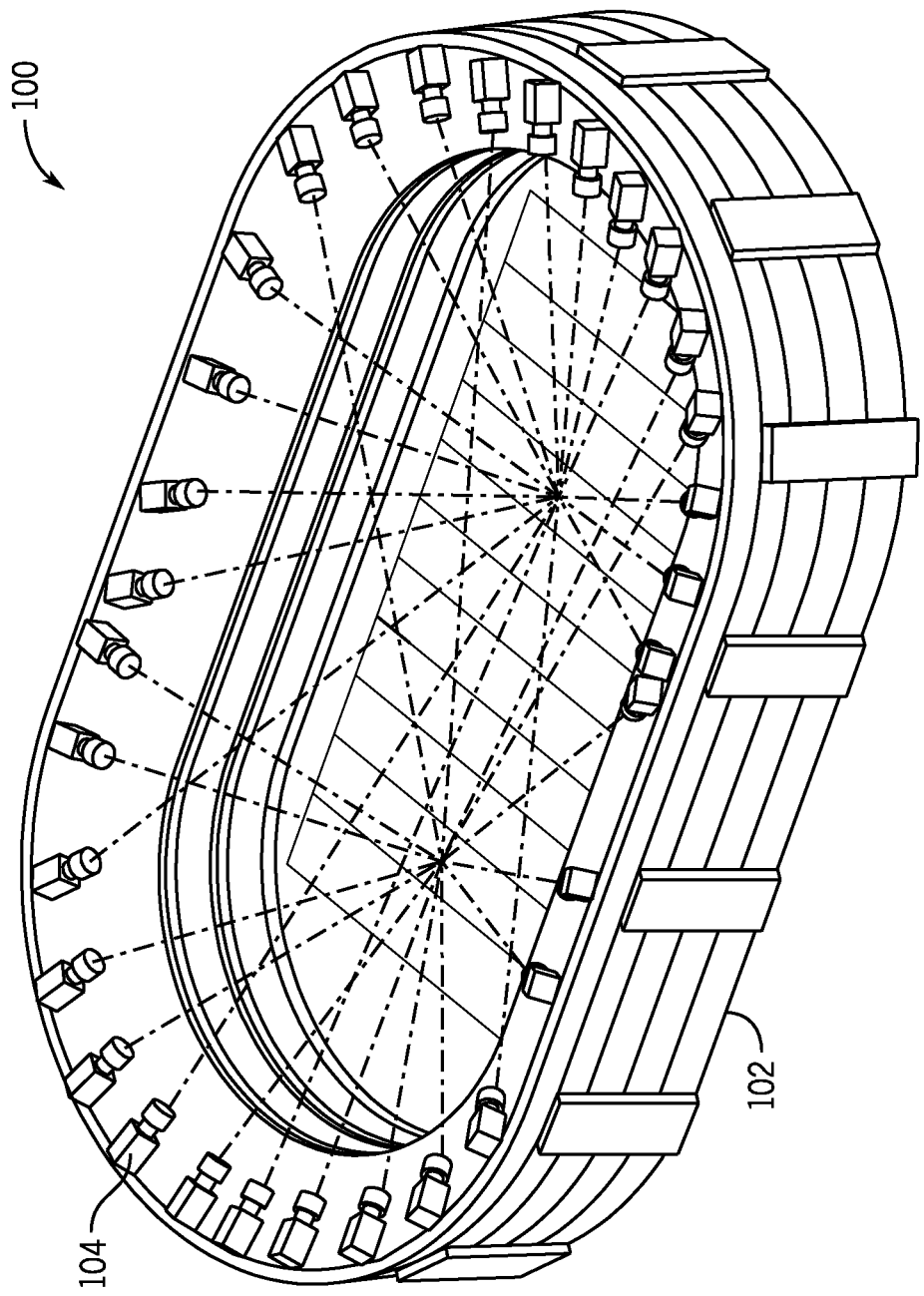
FIG. 1 is schematic diagram of multiple cameras positioned about a venue that may provide a virtual camera system, in accordance with an embodiment of the present disclosure.

One or more specific embodiments of the present disclosure will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developer's specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

In an embodiment, a system includes a plurality of cameras disposed about an area, at least one processor, and at least one non-transitory, computer-readable media communicatively coupled to the at least one processor, wherein the at least one non-transitory, computer-readable media is configured to store instructions which, when executed, cause the processor to perform operations including receiving a set of video data associated with the plurality of cameras. In an embodiment, the set of video data includes a set of image frames associated with a set of ball tracking data for a ball. In the embodiment, the operations also include selecting, based on the set of image frames and the set of ball tracking data, a first image frame associated with a first change in acceleration for the ball and a second image frame associated with a second change in acceleration for the ball. In the embodiment, the operations also include generating a set of virtual camera actions based on the first image frame and the second image frame.

In another embodiment, a method includes receiving a set of video data associated with a plurality of cameras. In an embodiment, the set of video data includes a set of image frames. In the embodiment, the method also includes generating, based on the set of video data, a set of ball tracking data for a ball and a set of player tracking data for a set of players. In the embodiment, the method also includes selecting, based on the set of image frames and the set of ball tracking data, a first image frame associated with a change in acceleration of the ball. In the embodiment, the method also includes generating a set of virtual image frames based on the set of video data, the set of virtual image frames comprising a first virtual image frame associated with the first image frame.

In another embodiment, a non-transitory, computer-readable medium includes instructions that, when executed, are configured to cause a processor to perform operations. In certain embodiments, the operations include receiving a set of video data associated with a plurality of cameras, the set of video data including a set of image frames. In some embodiments, the operations also include generating, based on the set of video data, a set of ball tracking data for a ball, the set of ball tracking data comprising a trajectory of the ball. In certain embodiments, the operations also include selecting, based on the trajectory of the ball being within a window, a first image frame of the set of image frames associated with the trajectory of the ball. In some embodiments, the operations also include generating a set of virtual image frames based on the set of video data, the set of virtual image frames comprising a virtual ball model associated with the set of ball tracking data and a set of virtual player models associated with the set of player tracking data.

Physical cameras may only be able to record game action from fixed angles and may not be adjusted during live gameplay to capture different angles of a pivotal sequence of the game. In addition, producers and/or directors may not know where on the field pivotal sequences will take place beforehand and may miss and/or capture an obstructed view of such sequences. Volumetric content can reproduce highlights of gameplay and allows for the dynamic movement and placement of a virtual camera in order to provide a better user experience in viewing sports and other live events. Highlights may be pivotal moments in gameplay, such as points being scored, a shot on target, a shot deflection, an assist, or any other suitable moment.

With the preceding in mind, FIG. 1 is a schematic diagram of a camera array 100 that may be used as a capture system for data acquisition used for 3D model generation and highlight creation in a virtual camera system, as described herein. The camera array 100 may include any number of cameras 104 positioned at multiple locations about a venue 102. Each of the cameras 104 may capture images of an event (e.g., a football player catching a pass, a soccer player scoring a goal, an entertainer singing on stage) occurring in the venue 102. Computer vision algorithms applied on the data captured by the cameras 104 may capture and record audiovisual information (e.g., video data and/or audio data) including height, weight, depth, and other suitable attributes of individuals participating in the event and may capture audiovisual information from any number of different angles. The data, such as audiovisual information, captured by the cameras 104 may be processed and analyzed to generate a set of virtual objects. For example, the audiovisual information may be captured by the cameras 104 and may be processed to generate three-dimensional volumetric video. A virtual camera may include a virtual view of the event based on the three-dimensional volumetric video, and the virtual view may be generated by processing the audiovisual information captured by the cameras 104 and generating three-dimensional virtual objects for elements on the playing field, such as the players and the ball.

Figures 2, 3:
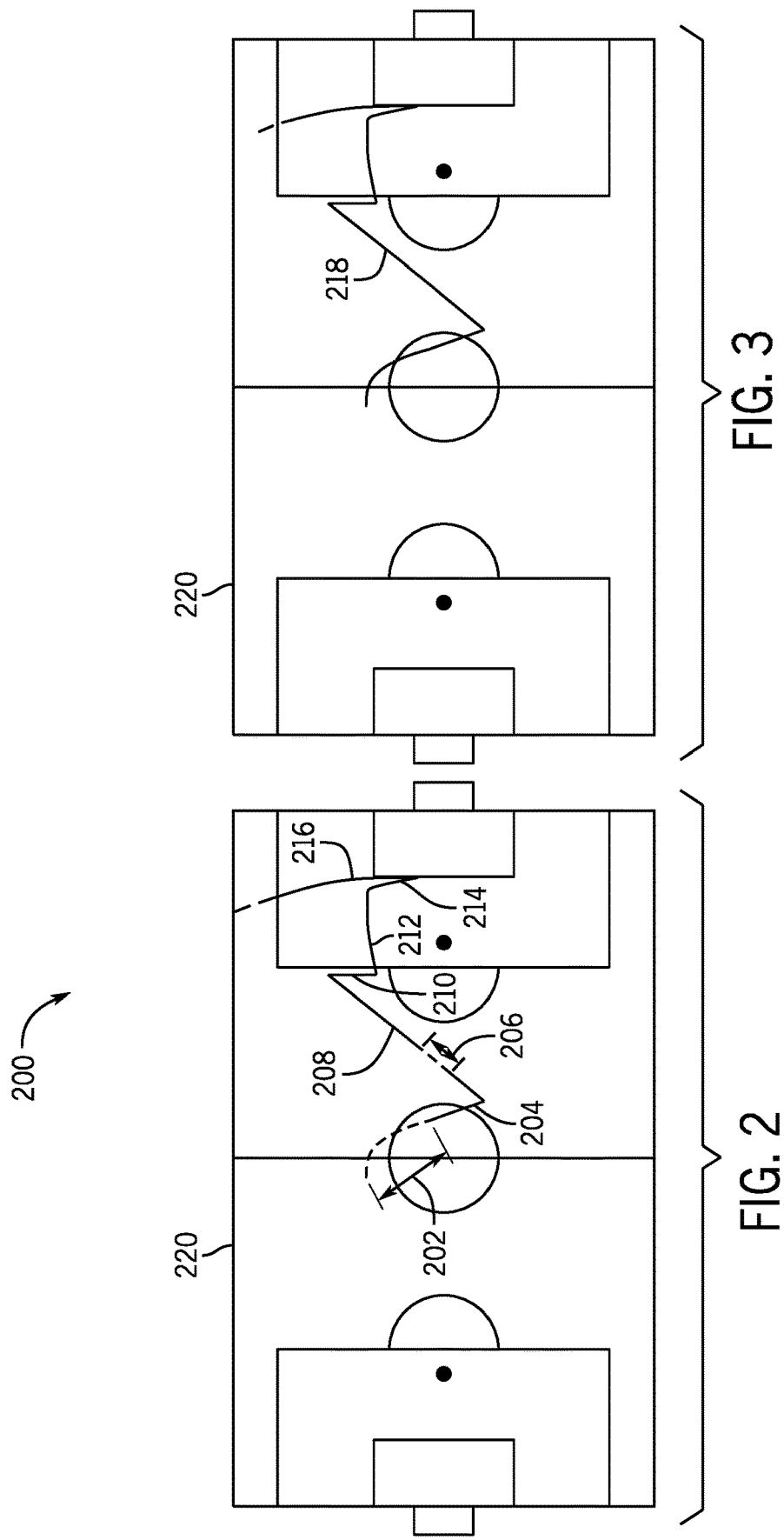
FIG. 2 is a schematic diagram illustrating operation of a ball detection and tracking algorithm of a virtual camera system, in accordance with an embodiment of the present disclosure.
FIG. 3 is a schematic diagram illustrating error correction of a ball detection and tracking algorithm of a virtual camera system, in accordance with an embodiment of the present disclosure.

Cameras, such as the cameras 104 in FIG. 1, may capture a game being played on a field in 360 degrees in real-time. The real-time video output from each camera may be streamed to a ball detector and tracker algorithm, via a server, to automatically detect and track the game ball, remove outliers, and fill in missing points in the ball's trajectory. With the preceding in mind, FIGS. 2 and 3 each illustrates a schematic diagram 200 of a playing field 220, such as a soccer playing field, in a venue, such as the venue 102 in FIG. 1. Ball detection and tracking is performed on each of the videos captured and recorded by cameras, such as cameras 104 in FIG. 1. The cameras may be calibrated in advance, but due to environmental factors such as, for example, vibrations, obstructed views, and other causes, the ball detection and tracking results may not be completely accurate. Thus, there may be false alarms or miss detection in any one camera. To overcome false alarms or miss detection in a single camera, the virtual camera system may perform cross-validation by comparing and associating ball detected from each camera video captured by any number of cameras to obtain an accurate 3D ball location.

The ball may be tracked and detected using image and/or pattern recognition techniques. The location of the game ball is detected on a frame-by-frame basis in real-time using a detection and tracking algorithm. The ball may first be detected before it is tracked. When a ball is detected in a frame using the detection and tracking algorithm, the ball may be tracked in the next frame using the detection and tracking algorithm. The ball may continue to be tracked in subsequent frames until tracking of the ball fails or the video ends. If tracking fails and the video has not ended, detection of the ball may resume using the detection and tracking algorithm. The detection and tracking algorithm may use a tracking-by-detection technique that performs image and/or pattern recognition techniques in a partitioned tile of an image frame in which the ball was located in the last image frame. Thus, the detection and tracking algorithm may perform the detection technique on the full image of a frame while performing the tracking technique on a single tile of a full image of a frame, thus reducing computing time and resource usage.

A path (e.g., paths 204, 208, 210, 212, 214, 216) of the ball determined by one of the detection and tracking algorithms associated with one of the cameras of the virtual camera system may contain a set (e.g., sets 202, 206) of missed detection data and/or tracking data inconsistencies. Missed detection data and/or tracking data inconsistencies may result from the ball being at least partially obscured by one or more players and/or an object similar in appearance to the game ball. The output of each detector and tracker algorithm for each camera may be cross-validated and compared against the output of the detector and tracker algorithms for other cameras in order to determine a trajectory 218 of the ball during a time period. The trajectory 218 of the ball may include any number of changes in direction, any number of changes in velocity, any number of changes in acceleration, and/or any number of changes in position of the ball during the time period.

Figure 4:
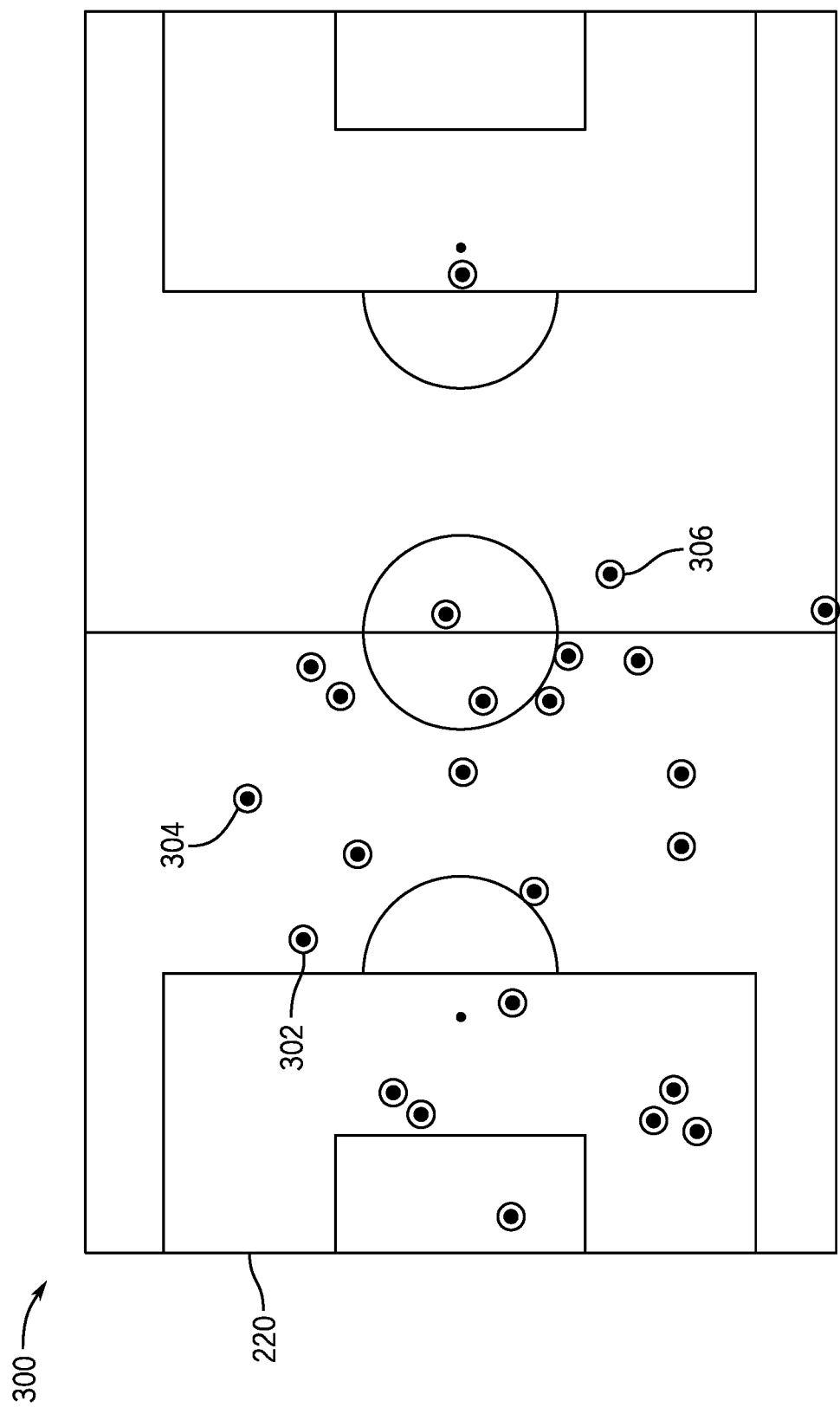
FIG. 4 is a schematic diagram illustrating operation of a player detection and tracking algorithm of a virtual camera system, in accordance with an embodiment of the present disclosure

The real-time video output from each camera is streamed to a player detector and tracker algorithm, via a server, to automatically detect and track players on the playing field 220. With the preceding in mind, FIG. 4 illustrates a schematic diagram 300 of a playing field 220, such as a soccer playing field, in a venue, such as the venue 102 in FIG. 1. Player detection and tracking is performed on each of the videos captured and recorded by cameras, such as cameras 104 in FIG. 1. The cameras may be calibrated in advance, but due to environmental factors such as, for example, vibrations, obstructed views, and other causes, the player detection and tracking results may not be completely accurate. Thus, there may be false alarms or missed detections in any one camera. To overcome false alarms or a missed detection in a single camera, the virtual camera system may perform cross-validation by associating players detected from each camera and comparing video captured by any number of cameras to obtain or confirm an accurate player location(s).

The location of the player is detected on a frame-by-frame basis in real-time using a detection and tracking algorithm. A player must first be detected before it can be tracked. The player will continue to be tracked in subsequent frames until tracking of the player fails or the video ends. If tracking fails and the video has not ended, detection of the player will resume using the detection and tracking algorithm. The detection and tracking algorithm uses a tracking-by-detection technique that performs a tracking only in a partitioned tile of an image frame in which the player was located in the last image frame. Thus, the detection and tracking algorithm performs the detection technique on the full image of a frame while the tracking technique is performed on a single tile of a full image of a frame. A location, velocity, acceleration, and/or any other suitable player tracking information for a player (e.g., players 302, 304, 306) may be determined by the player detection and tracking algorithm. For example, the player detection and tracking algorithm may compare a location of a detected player in a first frame to a location of the same detected player in a second, or subsequent, frame with an elapsed time between frames in order to determine a speed and/or direction of travel for the player.

Figure 5:
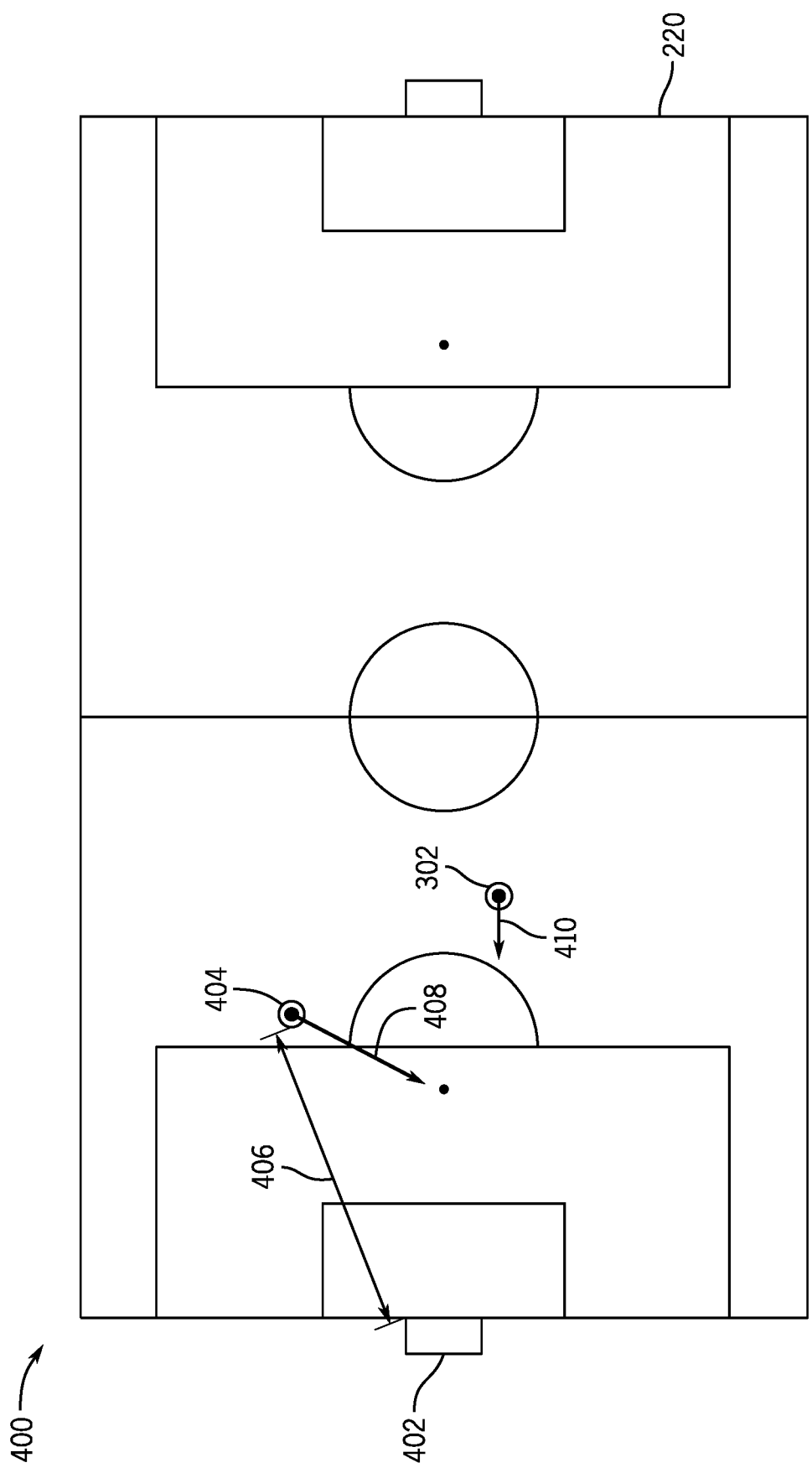
FIG. 5 is a schematic diagram illustrating operation of a player detection and tracking algorithm and a ball detection and tracking algorithm of a virtual camera system, in accordance with an embodiment of the present disclosure.

The location, velocity, and/or acceleration of a player on the field may be determined in relation to other objects (e.g., a goal, a ball, another player) in order to determine the occurrence of a highlight sequence during the game. For example, a player traveling with the ball near a goal may vary his or her velocity and/or acceleration prior to taking a shot. With the preceding in mind, FIG. 5 illustrates a schematic diagram 400 of a playing field 220 having a goal 402. The diagram 400 includes a player 302 and a player with a ball 404 (e.g., dribbling a soccer ball). The player detection and tracking algorithm and/or ball detection and tracking algorithm may determine a distance between the player 302 and the goal 402 and/or a distance 406 between the ball 404 and the goal 402. In some embodiments, the player detection and tracking algorithm may determine a direction 408 of travel for the ball 404. In certain embodiments, the player detection and tracking algorithm may determine a velocity 410, including both a speed and a direction of travel, for a player 302.

In certain embodiments, a trajectory of the ball 404 is tracked during the course of the game so that highlight moments may be generated from captured audiovisual data (e.g., video data and/or audio data). For example, turning points in the trajectory of the ball 404 as well as the trajectory itself, may be tracked relative to a target area (e.g., goal 402) on the playing field 220. The turning points may be points where a significant change of ball trajectory takes place, such as a change in acceleration, orientation, velocity, and/or direction of travel. Thus, the turning points may generally reflect interaction between a player and the ball 404. When a turning point satisfies a proximity condition (e.g., within ten meters, within five meters, within 2 meters, within 1 meter) with respect to the target area, the turning point may correspond to a shot towards the goal 402. As such, the turning point may be designated by the virtual camera system as a highlight moment that is used to render a scene as volumetric content.

Figure 6:
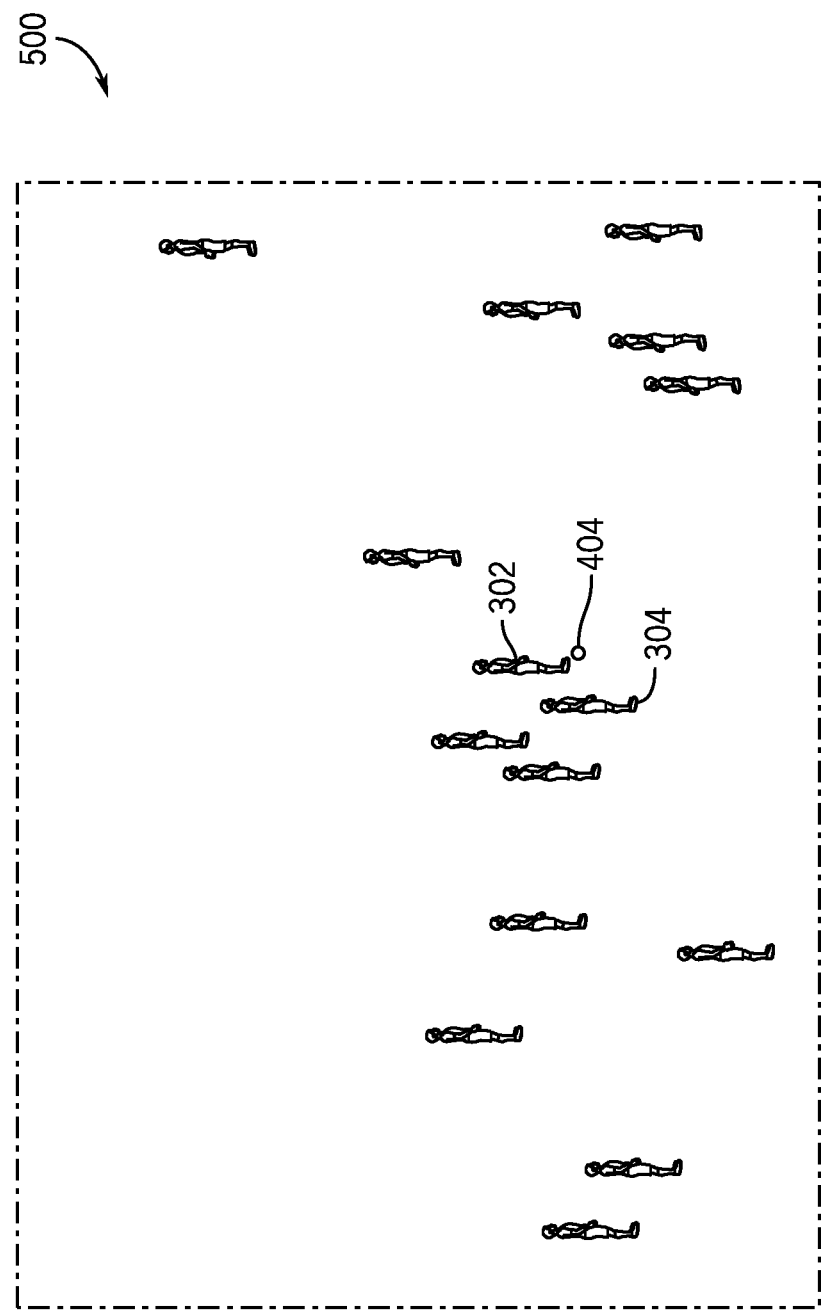
FIG. 6 is a schematic diagram of volumetric content generated using the virtual camera system of FIG. 1, in accordance with an embodiment of the present disclosure.

With the preceding in mind, FIG. 6 illustrates a schematic diagram 500 of volumetric content generated using a virtual camera system, in accordance with an embodiment of the present disclosure. The volumetric content may include three-dimensional virtual models of players (e.g., players 302, 304) and a ball (e.g., ball 404). The volumetric content may be generated based on audiovisual data captured by cameras, such as cameras 104 in FIG. 1. The virtual player models of the players 302, 304 may be generated based on the set of player tracking data and the virtual ball model may be generated based on the set of ball tracking data, as described herein.

Figure 7:
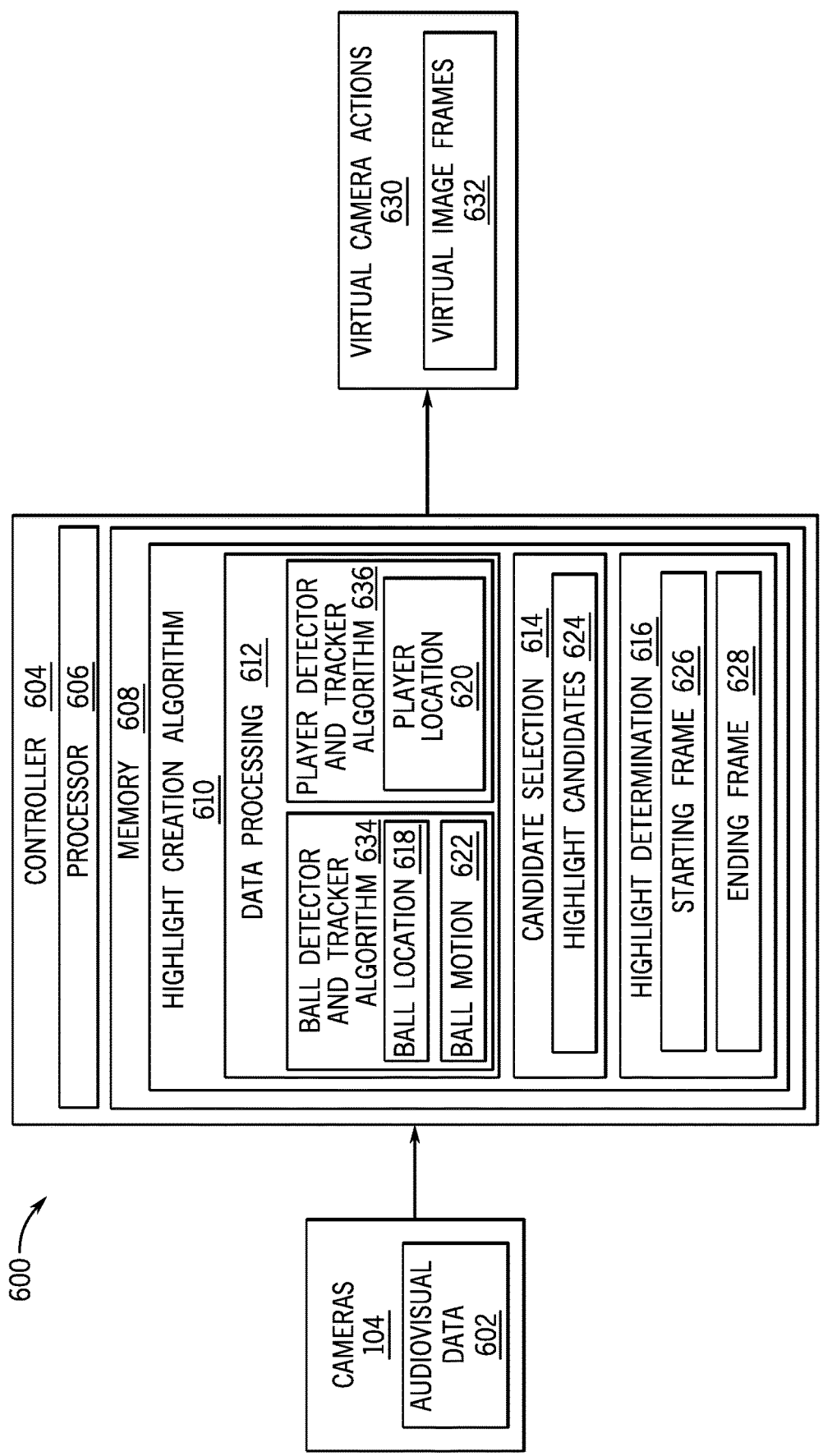
FIG. 7 is a block diagram of a virtual camera system for highlight creation, in accordance with an embodiment of the present disclosure.

A virtual camera system may capture, record, and/or receive audiovisual data and may use the audiovisual data for highlight creation associated with pivotal sequences of gameplay and/or important moments of a live event. With the preceding in mind, FIG. 7 illustrates a block diagram of a virtual camera system 600, according to embodiments of the present disclosure. The virtual camera system 600 may generate any number of virtual camera actions 630 corresponding to any number of virtual camera highlights. The virtual camera highlights may be formed of any number of virtual image frames 632. In some embodiments, the virtual camera system 600 may include a set of cameras, such as cameras 104 in FIG. 1, which may capture and record a set of audiovisual data 602 and may be used to generate virtual camera actions 630. In some embodiments, the set of audiovisual data 602 may include images and audio captured by any number of cameras, such as cameras 104. The virtual camera actions 630 may include focusing on a target of the virtual camera, changing an angle of the virtual camera relative to the target, changing a distance of the virtual camera from the target, adjusting a zoom of the virtual camera, and/or any other suitable movement of the virtual camera. For example, one generated virtual camera action may include following closely behind the ball to depict a fast pace of the game. The virtual camera actions 630 may include a set of instructions for operating a virtual camera. For example, the virtual camera actions 630 may include instructions to zoom in/out on a target, pan across a target, and/or rotate around a target.

In certain embodiments, the virtual camera system 600 may include a controller 604, which may be provided in the form or as part of a computing device, such as a personal computer, a laptop, a tablet, a mobile device, a server, or any other suitable computing device. As such, the controller 604 may include one or more general purpose microprocessors, one or more application specific integrated circuits (ASICs), and/or one or more field programmable logic arrays (FPGAs), such as a processor 606. The processor 606 may be communicatively coupled to a database storing the set of audiovisual data 602 and/or may be communicatively coupled to the cameras 104. The controller 604 may include receiving and/or conversion circuitry. In certain embodiments, the processor 606 of the virtual camera system 600 may receive the set of audiovisual data 602 and generate any number of virtual camera actions 630 based on the set of audiovisual data 602

In certain embodiments, the processor 606 may perform a highlight creation algorithm 610, which may include a set of instructions that operates a set of virtual cameras and generates a highlight. For example, the highlight creation algorithm 610 may be implemented as software stored in a memory 608 and/or a storage device of the virtual camera system 600. In some embodiments, the memory 608 may include one or more tangible, non-transitory computer-readable media that store instructions executable by the processor 606 and/or data to be processed by the processor 606. For example, the memory 608 may include random access memory (RAM), read only memory (ROM), rewritable non-volatile memory, such as flash memory, hard drives, optical discs, and/or the like.

In certain embodiments, the processor 606 may generate any number of virtual camera highlights that includes any number of virtual image frames 632 for viewing on an electronic display, by executing any suitable algorithm, such as the highlight creation algorithm 610, in response to receiving the set of audiovisual data 602. The highlight creation algorithm 610 may analyze the set of audiovisual data 602 and generate the virtual camera actions 630. The virtual camera actions 630 may be used to operate a virtual camera and generate virtual image frames 632 corresponding to a gameplay highlight. In some embodiments, the virtual camera actions 630 may control operation of a virtual camera to produce the virtual image frames 632 in a particular sequence. For example, the virtual image frames 632 may be produced to show a movement of a virtual camera based on the virtual camera action 630, such as a zoom, a pan, a rotation, or any other suitable virtual camera action. The virtual image frames 632 may be generated from audiovisual data 602 captured by cameras 104.

The highlight creation algorithm 610 may include a data processing component 612, a candidate selection component 614, and a highlight determination component 616. In certain embodiments, the data processing component 612 may receive and process the set of audiovisual data 602. The data processing component 612 may generate a set of data (e.g., ball location data 618, player location data 620, ball motion data 622) based on the set of audiovisual data 602, as described herein. In some embodiments, the player location data 620 may include a location, a velocity, an acceleration, a direction, an angular velocity, and/or an angular acceleration of a respective player. In certain embodiments, the data processing component 612 may generate ball location data 618, player location data 620, and/or ball motion data 622 for each image frame of the audiovisual data 602. In certain embodiments, the ball motion data 622 may include a velocity, an acceleration, a direction, an angular velocity, and/or an angular acceleration of the ball. In certain embodiments, the data processing component 612 may determine a boundary of a playing field, such as playing field 220, and/or a set of target areas (e.g., goals) associated with the playing field. The ball location data 618 may include a location of the ball on the playing field and/or a relative location of the ball to a target area, a player on the playing field, or a boundary of the playing field. The player location data 620 may include a location of the player on the playing field and/or a relative location of the player to the target area, the ball, another player, or a boundary of the playing field. The data processing component 612 may filter outliers and/or missing data from the set of audiovisual data to correct errors in the ball's trajectory and/or player locations and movement, as described herein.

The candidate selection component 614 may determine a set of highlight candidates 624 associated with a set of turning points, as described herein. The candidate selection component 614 may identify a turning point in a trajectory of a ball based on the ball motion data 622. In some embodiments, the turning point may be associated with an interaction (e.g., kick, pass, catch, hit) between the ball and a player (or another obstacle such as the ground or a goal post). The candidate selection component 614 may detect a significant change in the velocity, acceleration, and/or direction of the ball based on the set of ball motion data 622. In some embodiments, the candidate selection component 614 may identify a peak acceleration, and/or a peak velocity, as the turning point. In certain embodiments, the candidate selection component 614 may identify a turning point by comparing the ball location data 618 to a proximity condition. For example, the candidate selection component 614 may determine the ball location data 618 indicates the ball is within a threshold proximity (e.g., within ten meters, within five meters, within two meters, within one meter) to the goal. In some embodiments, the candidate selection component 614 designates a turning point as a highlight candidate 624 that may be used to generate a virtual camera highlight. In certain embodiments, the candidate selection component 614 may identify a turning point based on the set of ball motion data 622 that indicates the ball is moving away from a goal or target area. For example, the turning point may be associated with an interaction between the ball and a defensive player clearing the ball away from the goal or target area. In certain embodiments, the candidate selection component 614 may associate identified turning points with one or more image frames from the audiovisual data 602.

The highlight candidates 624 identified by the candidate selection component 614 may correspond to pivotal moments during the game. The highlight determination component 616 may determine cutoff points (e.g., start and end times) for each highlight candidate 624 identified by the candidate selection component 614 based on, for example, the ball location data 618, the player location data 620, and the ball motion data 622. The highlight determination component 616 may receive the highlight candidates 624 from the candidate selection component 614 and may determine starting image frames 626 and ending image frames 628 for each highlight candidate. In certain embodiments, the highlight determination component 616 may determine that the starting image frame 626 corresponds to the turning point identified by the candidate selection component 614. For example, the highlight determination component 616 may determine the starting frame 626 is a shot by an offensive player based on the ball location data 618 being within a threshold proximity of the goal, the player location data 620 indicating an offensive player is in control of the ball, and/or the ball motion data 622 indicating the ball is accelerating and/or traveling towards the goal.

In certain embodiments, the highlight determination component 616 may identify two or more highlight candidates 624 correspond to a single virtual highlight. For example, the highlight determination component 616 may identify a starting frame 626 associated with a shot on goal turning point based on the ball location data 618, the player location data 620, and/or the ball motion data 622, another image frame associated with a deflection of the shot, and/or an ending frame 628 based on the ball location data 618 indicating the ball entered the goal. As such, a virtual camera highlight generated by the highlight creation algorithm 610 may be associated with any number of turning points identified by the candidate selection component 614. In certain embodiments, the highlight determination component 616 may select an image frame a short time prior to (e.g., between zero and ten seconds, such as one second, 2 seconds, 5 seconds) or after (e.g., between zero and ten seconds, such as one second, 2 seconds, 5 seconds) the turning point as the starting frame 626 and/or ending frame 628 in order to capture a buildup and/or an aftermath to the turning point. The highlight determination component 616 may select the starting frame 626, the ending frame 628, and at least some frames in between as the virtual highlight for creation.

Figure 8:
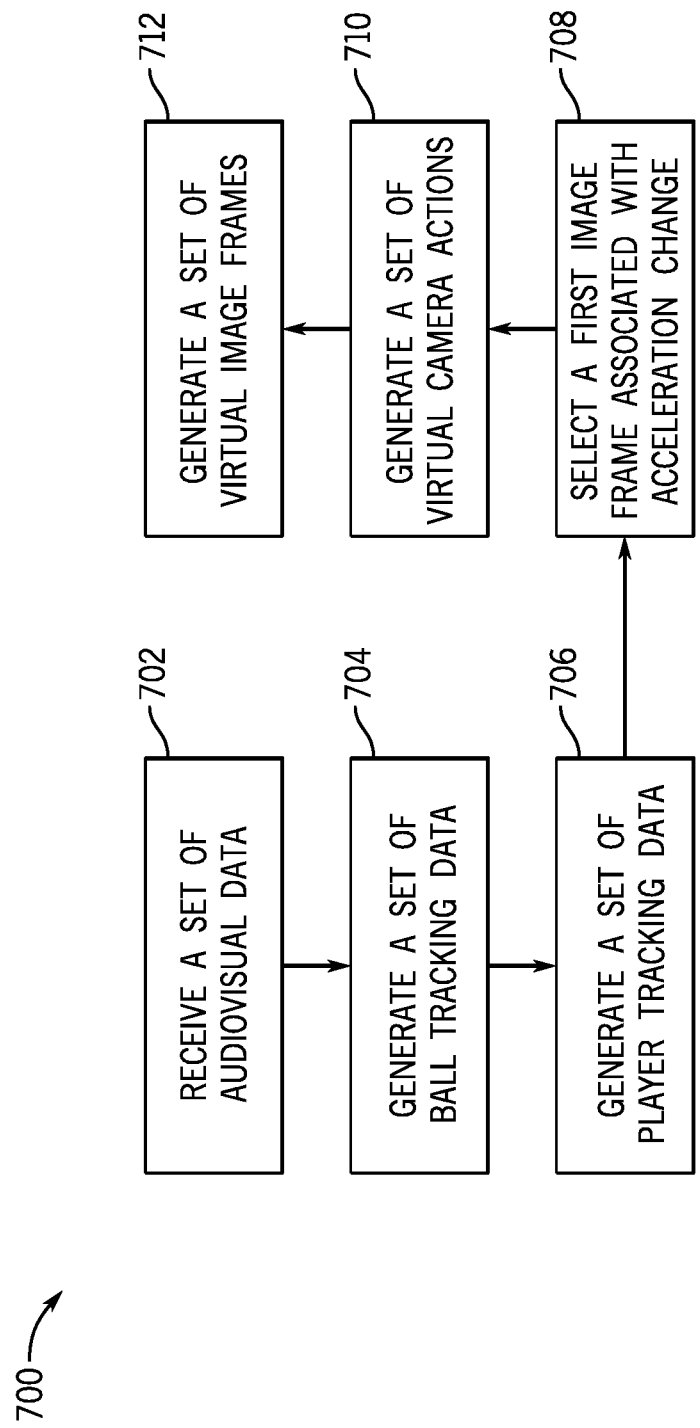
FIG. 8 is a flow diagram of a process for generating virtual highlights, in accordance with an embodiment of the present disclosure.

With the preceding in mind, FIG. 8 is a flow diagram of a process 700 for generating a set of virtual camera actions, according to embodiments of the present disclosure. While the process 700 is described as being performed by the controller 604, it should be understood that the process 700 may be performed by any suitable device that may control and/or communicate with components of the virtual camera system 600, such as the controller 604 and/or the processor 606. Furthermore, while the process 700 is described using steps in a specific sequence, it should be understood that the present disclosure contemplates that the described steps may be performed in different sequences than the sequence illustrated, and certain described steps may be implemented by executing instructions stored in a tangible, non-transitory, computer-readable medium, such as the memory 608, using any suitable processing circuitry, such as the processor 606.

In this process 700, a set of audiovisual data is generated by cameras, such as cameras 104, in FIG. 1, and received (step 702) at a controller, such as the controller 604. The set of audiovisual data may include a set of image frames and/or one or more audio signals (e.g., correlating to the set of image frames). The controller 604 may analyze the set of audiovisual data to generate a set of ball tracking data (step 704) by, for example, using the ball detector and tracker algorithm 634 of FIG. 7, and a set of player tracking data (step 706) by, for example, using the player detector and tracker algorithm 634 of FIG. 7, as described herein. The ball tracking data may include ball acceleration data, ball velocity data, and ball direction data, as described herein.

The controller 604 may select (step 708) a first image frame of the set of audiovisual data associated with an acceleration change based on the ball tracking data and/or the player tracking data. For example, the controller 604 may select a peak acceleration of the ball and/or the player. In some embodiments, the controller 604 may identify the first image frame as a starting frame or an ending frame of a virtual camera highlight. In certain embodiments, the controller 604 may select a second image frame from the set of audiovisual data as a corresponding starting image frame or a corresponding ending image frame associated with the first image frame. The controller 604 may select the first image frame, the second image frame, and any frames therebetween for creation of the virtual camera highlight. In some embodiments, the controller 604 may select an image frame based on any suitable motion and/or location identified in the ball tracking data and/or the player tracking data. For example, the controller 604 may select a peak height of a ball, a height change of the ball, a change in direction of a ball, a proximity of the ball to a target area, a time remaining in the game, a score of game, a proximity of a player to the ball, or any other suitable motion and/or location of a player and/or the ball.

The controller 604 may generate (step 710) a set of virtual camera actions based on the selected image frames. In certain embodiments, the set of virtual camera actions may include instructions to operate a virtual camera system to generate a set of virtual image frames based on the selected image frames. For example, if the selected image frames correspond to a peak acceleration of a ball towards a goal, then the set of virtual camera actions may include instructions to target a ball in the foreground and the goal in the background in order to capture the sequence of events as the ball travels towards the goal. As another example, if the selected image frames correspond to one or more changes in direction of the ball, then the set of virtual camera actions may include instructions to rotate the virtual camera about the ball. In certain embodiments, the virtual camera actions may include changing a zoom of the virtual camera, changing a target of the virtual camera, changing a direction of motion of the virtual camera, or any other suitable virtual camera action, as described herein. The set of virtual camera actions may be used by a virtual camera system, such as virtual camera system 600 in FIG. 7, to generate a set of virtual image frames (step 712).

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . ." or "step for [perform]ing [a function] . . .", it is intended that such elements are to be interpreted under 35 U.S.C. § 112(f). However, for any claims containing elements designated in any other manner, it is intended that such elements are not to be interpreted under 35 U.S.C. § 112(f).

What is claimed is:

1. A system, comprising:
   a plurality of cameras disposed about an area;
   at least one processor; and at least one non-transitory, computer-readable media communicatively coupled to the at least one processor, wherein the at least one non-transitory, computer-readable media is configured to store instructions which, when executed, cause the processor to perform operations comprising:
   receiving a set of video data from the plurality of cameras, the set of video data comprising a set of image frames associated with a set of ball tracking data for a ball;
   determining, based on the set of image frames and the set of ball tracking data, a peak acceleration of the ball;
   selecting, based on the set of image frames and the set of ball tracking data, a first image frame associated with a first change in acceleration for the ball and a second image frame associated with a second change in acceleration for the ball, wherein the first change in acceleration for the ball corresponds to the peak acceleration and the second change in acceleration corresponds to a change in direction of the ball; and
   generating a set of virtual camera actions based on the first image frame and the second image frame.

2. The system of claim 1, wherein the instructions, when executed, cause the processor to perform the operations, wherein the operations comprise:
   generating a set of virtual image frames associated with the virtual camera actions; and
   generating a virtual ball model based on the set of ball tracking data.

3. The system of claim 2, wherein the set of virtual image frames comprises a first virtual image frame associated with a first time and a second virtual image frame associated with a second time.

4. The system of claim 2, wherein the instructions, when executed, cause the processor to perform the operations comprising generating a set of player tracking data for a set of players based on the set of image frames.

5. The system of claim 4, wherein the instructions, when executed, cause the processor to perform the operations, wherein the operations comprise generating a set of virtual player models based on the set of player tracking data.

6. The system of claim 4, wherein the set of player tracking data comprises a velocity of at least one player or an acceleration of the at least one player.

7. The system of claim 1, wherein the set of virtual camera actions comprises a pan, a zoom, a focus, a tilt, or any combination thereof.

8. The system of claim 1, wherein the first image frame is a starting image frame of a highlight.

9. The system of claim 1, wherein the set of ball tracking data comprises a location of the ball, a velocity of the ball, an acceleration of the ball, or any combination thereof.

10. A method, comprising:
    receiving a set of video data from a plurality of cameras, the set of video data comprising a set of image frames;
    generating, based on the set of video data, a set of ball tracking data for a ball and a set of player tracking data for a set of players;
    selecting, based on the set of image frames and the set of ball tracking data, a first image frame associated with a change in acceleration of the ball, wherein the change in acceleration comprises a maximum change in acceleration associated with the set of ball tracking data; and
generating a set of virtual image frames based on the set of video data, the set of virtual image frames comprising a first virtual image frame associated with the first image frame.

11. The method of claim 10, comprising determining that the change in acceleration of the ball exceeds a threshold change in acceleration.

12. The method of claim 10, comprising determining a location of the ball associated with the set of ball tracking data is within an area.

13. The method of claim 12, comprising selecting, based on the location of the ball being within the area, a second image frame associated with the location.

14. The method of claim 13, comprising displaying the set of virtual image frames, the set of virtual image frames comprising a second virtual image frame associated with the second image frame.

15. A non-transitory, computer-readable medium comprising instructions that, when executed, are configured to cause a processor to perform operations comprising:
receiving a set of video data from a plurality of cameras, the set of video data comprising a set of image frames;
generating, based on the set of video data, a set of ball tracking data for a ball, the set of ball tracking data comprising a trajectory of the ball, wherein the trajectory of the ball comprises a change in acceleration of the ball;
determining, based on the set of ball tracking data, a peak acceleration of the ball;
determining, based on the trajectory of the ball being within a goal area, a first image frame of the set of image frames associated with the trajectory of the ball, wherein the first image frame corresponds to the peak acceleration of the ball; and
generating a set of virtual image frames based on the set of video data, the set of virtual image frames comprising a virtual ball model associated with the set of ball tracking data and a set of virtual player models associated with a set of player tracking data.

16. The non-transitory, computer-readable medium of claim 15, wherein the instructions, when executed, cause the processor to perform the operations, wherein the operations comprise selecting a second image frame of the set of image frames based on a change in the trajectory of the ball.

17. The non-transitory, computer-readable medium of claim 15, wherein the set of ball tracking data comprises a location of the ball, an acceleration of the ball, or a combination thereof.

18. The non-transitory, computer-readable medium of claim 15, wherein the instructions, when executed, cause the processor to perform the operations, wherein the operations comprise selecting a second image frame of the set of image frames based on a location of the ball being within an area, the second image frame associated with the location of the ball.

19. The method of claim 10, comprising:
selecting, based on the set of image frames and the set of ball tracking data, a second image frame spaced a first threshold time before the first image frame; and
selecting, based on the set of image frames and the set of ball tracking data, a third image frame spaced a second threshold time after the first image frame, wherein the set of virtual camera frames comprises:
a second virtual image frame associated with the second image frame; and
a third virtual image frame associated with the third image frame.

20. The non-transitory, computer-readable medium of claim 15, wherein the operations comprise determining that the ball is within a threshold proximity of the goal area.

* * * * *